(12) United States Patent
Limonad et al.

(10) Patent No.: US 11,657,310 B2
(45) Date of Patent: May 23, 2023

(54) UTILIZING STOCHASTIC CONTROLLER TO PROVIDE USER-CONTROLLED NOTIFICATION RATE OF WEARABLE-BASED EVENTS

(71) Applicant: International Business Machines Corporation, Armonk, NY (US)

(72) Inventors: Lior Limonad, Nesher (IL); Nir Mashkif, Ein Carmel (IL); Segev E Wasserkrug, Haifa (IL); Alexander Zadorojniy, Haifa (IL); Sergey Zeltyn, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 1423 days.

(21) Appl. No.: 14/988,763

(22) Filed: Jan. 6, 2016

(65) Prior Publication Data

US 2017/0193383 A1    Jul. 6, 2017

(51) Int. Cl.
*G06F 9/54* (2006.01)
*G06N 7/01* (2023.01)
(Continued)

(52) U.S. Cl.
CPC ............... *G06N 7/01* (2023.01); *G06F 1/163* (2013.01); *G06F 3/011* (2013.01); *G06F 3/0481* (2013.01);
(Continued)

(58) Field of Classification Search
CPC .................................................. G06N 7/005
See application file for complete search history.

(56) References Cited

U.S. PATENT DOCUMENTS 7,865,904 B2    1/2011  McKee et al.
9,854,084 B2 *  12/2017 Chang ............... H04M 1/72454
(Continued)

FOREIGN PATENT DOCUMENTS

CN    103903072 A  *  7/2014
CN    105309040 A  *  2/2016  ........ H04M 1/72569
(Continued)

OTHER PUBLICATIONS

Hyungik Oh et al., "An Intelligent Notification System Using Context from Real-Time Personal Activity Monitoring", IEEE, 2015. (Year: 2015).*
(Continued)

*Primary Examiner* — Alexey Shmatov
*Assistant Examiner* — Beatriz Ramirez Bravo
(74) *Attorney, Agent, or Firm* — Barry D. Blount (57) ABSTRACT

Method, apparatus and product for utilizing stochastic controller to provide user-controlled notification rate of wearable-based events. The method comprises obtaining events issued by a module based on analysis of multiple sensor readings of one or more sensors of a wearable device. The method further comprises determining by a stochastic controller whether to provide an alert to a user based on the events and based on a user preference, wherein the user preference is indicative of a desired notification rate of the user, wherein the stochastic controller comprises a stochastic model of an environment. Based on such determination, alerts are outputted to the user.

21 Claims, 4 Drawing Sheets

(51) Int. Cl.
*G06F 1/16* (2006.01)
*G06F 3/01* (2006.01)
*G06F 3/0481* (2022.01)
*G08B 21/04* (2006.01)
*G08B 21/12* (2006.01)

(52) U.S. Cl.
CPC ............ *G06F 9/542* (2013.01); *G08B 21/043* (2013.01); *G08B 21/0446* (2013.01); *G08B 21/0453* (2013.01); *G08B 21/12* (2013.01)

(56) References Cited

U.S. PATENT DOCUMENTS

| | | | |
|---|---|---|---|
| 2007/0297327 | A1* | 12/2007 | Strom .................. H04L 67/322 370/230 |
| 2012/0166530 | A1 | 6/2012 | Tseng |
| 2013/0085983 | A1* | 4/2013 | Osogami ................ G06N 20/00 706/52 |
| 2013/0324160 | A1 | 12/2013 | Sabatellil et al. |
| 2014/0347265 | A1* | 11/2014 | Aimone ................ G09G 3/003 345/156 |
| 2016/0094936 | A1* | 3/2016 | Yang ........................ H04Q 9/00 455/456.1 |
| 2016/0170991 | A1* | 6/2016 | Birchall ............ G06F 16/24578 707/751 |
| 2017/0031449 | A1* | 2/2017 | Karsten ............... G06F 19/3418 |
| 2017/0124474 | A1* | 5/2017 | Kashyap ................ G06N 20/00 |
| 2018/0270520 | A1* | 9/2018 | Ott ...................... H04N 21/466 |

FOREIGN PATENT DOCUMENTS

| | | | | |
|---|---|---|---|---|
| CN | 103458532 B | * | 1/2017 | |
| EP | 1203307 B1 | * | 4/2003 | ............ G06F 9/453 |
| WO | 2013180892 | | 12/2013 | |

OTHER PUBLICATIONS

Andrea Ceccarelli et al., "Desing and Implementation of real-time wearable devices for safety critical track warning system", IEEE, 2012. (Year: 2012).*
Luca Fanucci et al., "Sensing Devices and Sensor Signal Processing for Remote Monitoring of Vital Signs in CHF Patients", IEEE, 2013. (Year: 2013).*
Daniel Afergan et al., "Phylter: A system for Modulating Notifications in Wearables Using Physiological Sensing", Springer, 2015. (Year: 2015).*
Nicky Kern et al., "Context-Aware Notification for Wearable Computing", IEEE, 2003. (Year: 2003).*
Hunt et al., "Feedback control of heart rate during outdoor running: A smartphone implementation", Eisevier, (Jan. 5, 2016). (Year: 2016).*
Daniel Afergan., "Phylter: A System for Modulating Notications in Wearables Using Physiological Sensing", Can be found at: http://www.eecs.tufts.edu/~afergan/Phylter.pdf.
Hyungik Oh et al., "An intelligent notification system using context from real-time personal activity monitoring", Multimedia and Expo (ICME), 2015 IEEE International Conference on Date of Conference: Jun. 29, 2015-Jul. 3, 2015, pp. 1-6.
Roland Bader et al., "Context-Aware POI Recommendations in an Automotive Scenario using Multi-Criteria Decision Making Methods", Proceedings of the 2011 Workshop on Context-awareness in Retrieval and Recommendation, pp. 23-30, New York, NY, USA , 2011.

* cited by examiner

UTILIZING STOCHASTIC CONTROLLER TO PROVIDE USER-CONTROLLED NOTIFICATION RATE OF WEARABLE-BASED EVENTS

TECHNICAL FIELD

The present disclosure relates to wearable devices in general, and to optimizing notification rate of alerts issued based on sensors of wearable devices, in particular.

BACKGROUND

Wearable devices are clothing and accessories incorporating computer and advanced electronic technologies. Wearable devices (WDs) often incorporate practical functions and features and they comprise sensors that monitor varied measurements of the user wearing the device.

Analysis of the measurements by the sensors of the WDs may be performed using event processing techniques, such as Complex Event Processing (CEP). Derived events may be determined and passed by the event processing module after analyzing the incoming readings. The analysis may identify meaningful events and issue derived events alerting thereof.

Users may be alerted on important events, such as hazardous event (e.g., sudden increase in body temperature, exposure to hazardous materials, or the like), opportunity events (e.g., suggested improvement to movement of an athlete, or the like). Alerts may be issued and notify the user, such as via the WD itself or via an associated user device, such as a mobile phone.

BRIEF SUMMARY

One exemplary embodiment of the disclosed subject matter is a computer-implemented method comprising: obtaining events issued by a module based on analysis of multiple sensor readings of one or more sensors of a wearable device; determining by a stochastic controller whether to provide an alert to a user based on the events and based on a user preference, wherein the user preference is indicative of a desired notification rate of the user, wherein the stochastic controller comprises a stochastic model of an environment; and outputting alerts to the user based on said determining.

Another exemplary embodiment of the disclosed subject matter is a computerized apparatus having a processor, the processor being adapted to perform the steps of: obtaining events issued by a module based on analysis of multiple sensor readings of one or more sensors of a wearable device; determining by a stochastic controller whether to provide an alert to a user based on the events and based on a user preference, wherein the user preference is indicative of a desired notification rate of the user, wherein the stochastic controller comprises a stochastic model of an environment; and outputting alerts to the user based on said determining.

Yet another exemplary embodiment of the disclosed subject matter is a computer program product comprising a computer readable storage medium retaining program instructions, which program instructions when read by a processor, cause the processor to perform a method comprising: obtaining events issued by a module based on analysis of multiple sensor readings of one or more sensors of a wearable device; determining by a stochastic controller whether to provide an alert to a user based on the events and based on a user preference, wherein the user preference is indicative of a desired notification rate of the user, wherein the stochastic controller comprises a stochastic model of an environment; and outputting alerts to the user based on said determining.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

One technical problem dealt with by the disclosed subject matter is to provide for user control over notification rate of alerts, while avoiding missing important alerts.

In some exemplary embodiments, the disclosed subject matter tackles the problem of context-aware on-line control of the system consisting of wearable devices and the user such that a required quality is achieved (e.g., user properly and timely notified) and notifications rate is adapted to the user preferences.

In some exemplary embodiments, there may be environmental disturbances, such as partial information about user job position, location, requirements, preferences, behaviors, or the like. It may be desired that such environmental disturbances may be taken into consideration in filtering potential alerts. Additionally or alternatively, user feedback may be provided while the system is operating and taken into account in the determination as well.

One technical solution is to utilize a stochastic controller to determine whether to provide an alert to the user on an event issued by an analytics module. The stochastic controller may comprise a model of the stochastic environment in which the readings are issued and analyzed. The stochastic controller may base its determination on a user preference indicating of a desired notification rate by the user.

In some exemplary embodiments, the stochastic controller may define a target cost (objective function) function that is affected by a user-controlled parameter, such as a user-defined weight. The user may control the weight during the operation of the wearable device. An optimized policy may be computed to minimize expected value of the objective function.

In some exemplary embodiments, the stochastic controller may be based on a Markov Decision Process (MDP). The MDP may comprise a set of states, a set of actions, an immediate cost function which is based on a state and an event, a transition probabilities matrix and initial states distribution. The stochastic controller may apply an optimized policy which minimizes an objective function. The optimized policy may be re-computed upon modification of any of the definitions of the MDP, such as a modification to the cost function which may be caused by a user amending her preference, a modification of the transition probabilities matrix based on current data, or the like.

In some exemplary embodiments, the transition probabilities matrix may be computed based on historical data. The transition probabilities matrix may be updated based on current data, which may imply different transition probabilities than originally determined based on the historical data.

One technical effect of the disclosed subject matter may be to avoid sending information at wrong times to the user, such as avoiding sending an alert that the user cannot respond to or has nothing to do with at the reception time (or near future) and avoiding annoying and distracting the user with useless information such as false positive alerts, redundant alerts, or the like. The disclosed subject matter may assist in avoiding alert fatigue which may cause the user to be desensitized to alerts which may lead to longer response time or to missing important alerts.

Another technical effect of the disclosed subject matter may be providing individual level treatment of alerts. Additionally or alternatively, modular and scalable architecture is provided that is capable of handling alerts and analyze sensor readings. Additionally or alternatively, the disclosed subject matter may provide for environment sensitive notification rate.

Yet another technical effect may be avoiding a requirement of having supervised data upfront for training the controller. In some cases, the stochastic controller may be configured with an initial, reduced model, which may be tuned during operation as new measurements are received from the sensors. This is in contrary to machine learning techniques which would require supervised training data in order for a predictor to correctly predict a desired result.

Yet another technical effect may be to provide for a modular platform in which the analysis component is independent of the notification component. As a result, the analysis component need not track whether previous events were notified to the user, and complexity which may be associated with tracking and considering such information may be avoided. Similarly, the controller responsible for determining whether or not to notify the user need not be aware of and affected by complicated computations required to analyze the sensor readings.

Figure 1:
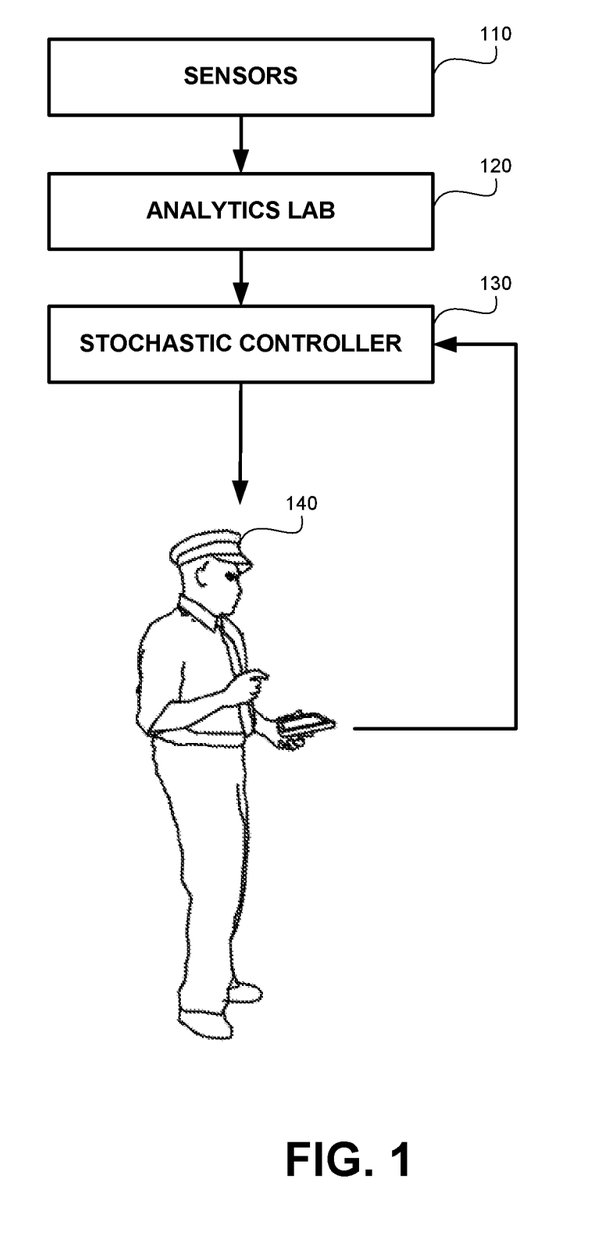
FIG. 1 shows a schematic exemplary environment in which the disclosed subject matter is used, in accordance with some exemplary embodiments of the subject matter.

Referring now to FIG. 1 showing a schematic exemplary environment in which the disclosed subject matter is used, in accordance with some exemplary embodiments of the subject matter.

The environment may be configured to issue alerts to a User 140. In some exemplary embodiments, the alerts may be safety-related, as may be the case in factories and plants (e.g., various hazard notifications to employees based on their measurements). Additionally or alternatively, the alerts may be in the realm of assisted living, such as in eldercare (e.g., alerting a nurse of medical situation, of a patient falling, or the like). Additionally or alternatively, alerts may be associated with wellness, such as in gyms and during sporting activities (e.g., warning notifications to a person regarding a dangerous movement).

Sensors 110 comprised by a wearable device worn by a subject are used to monitor measurements associated with the subject. As an example, the measurements may be of heart rate, body temperature, acceleration, position, humidity, perspiration, or the like.

An Analytics Lab 120 may be a computing device configured to analyze the measurements and determine events. Analytics Lab 120 may be part of the wearable device, on a secondary device, such as a mobile device connected to the wearable device, on a remote device, such as remote server or cloud-computing platform. Analytics Lab 120 may be configured to perform Complex Event Processing (CEP) analysis of the events to generate derived events, indicative of potential notification to User 140.

Stochastic Controller 130 may be configured to obtain the events determined by Analytics Lab 120 and determine whether or not to notify User 140. Stochastic Controller 130 may be part of the wearable device, of a secondary device, of a remote server, or the like.

Stochastic Controller 130 may utilize an MDP to make its determination based on an optimized policy applied so as to minimize an objective function. The objective function may depend upon user preference which may be modified by User 140. As an example, scroll bar User Interface (UI) element may be used by User 140 to increase or decrease notification rate. Similarly, a dial button UI element may be used, an increase or decrease buttons, or the like.

The MDP may comprise set of states, set of actions, an immediate cost function indicative of a cost for moving from one state to the other based on an action and state, a transition probabilities matrix comprising probability of transitions between each pair of states, or the like. An optimized policy may be determined for the MDP to minimize the expected total cost, or discounted cost, or another cost function type. In some cases, the cost function may be based on the user preference, such as set weights based on preference of the user. As an example, the cost function may combine a weighted cost of deciding not to issue an alert and a weighted cost of deciding to alert and to disturb the user.

In some exemplary embodiments, a constraint MDP (CMDP) may be utilized by Stochastic Controller 130.

Based on a decision by Stochastic Controller 130, an alert regarding an event s may be sent to User 140. In some embodiments, User 140 may consequently update the user's preference to increase or decrease notification rate.

Figure 2A:
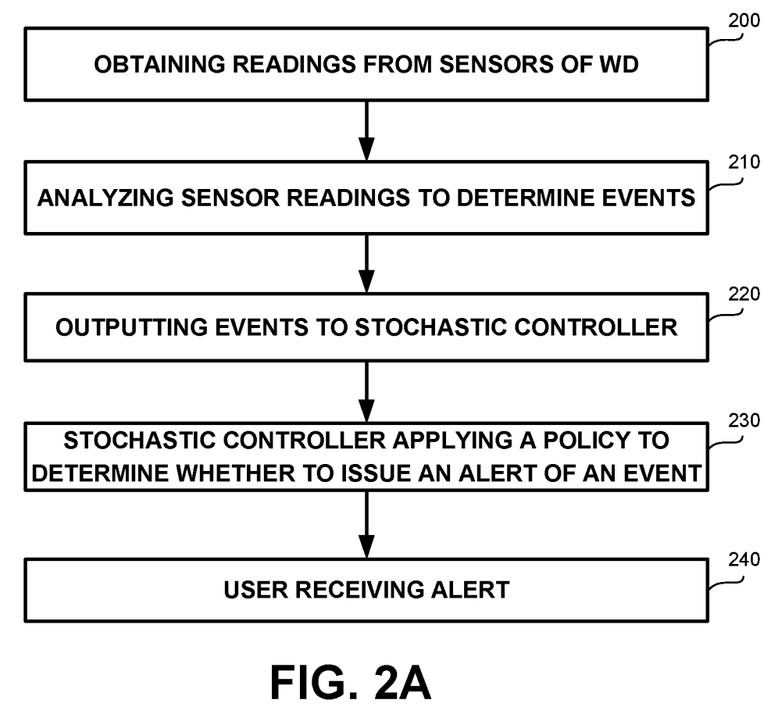
FIG. 2A-2C show flowchart diagrams of methods, in accordance with some exemplary embodiments of the subject matter.

Referring now to FIG. 2A showing a flowchart diagram of a method, in accordance with some exemplary embodiments of the subject matter On Step 200, sensor readings are obtained from a wearable device (WD). The readings may be transmitted from the WD to a secondary device having more resources, such as a mobile device of the user. The secondary device may also obtain readings from a plurality of sensors, such as from a plurality of WDs worn by a same subject, WDs worn by other subjects and sensors that are not mounted on wearable devices (e.g., stationary sensors, sensors attached to devices, vehicles, buildings, or the like.

On Step 210, sensor readings are analyzed, such as by an analytics lab (e.g. 120 of FIG. 1). The analysis may be performed by the secondary device.

On Step 220, based on the analysis, events may be determined. The events may be passed to a stochastic controller, such as 130 of FIG. 1.

On Step 230, a stochastic controller may apply a policy to determine whether to issue an alert based on the events that were generated on Step 210. In some cases, the policy may be a pre-computed policy that is configured to minimize an objective function. Additionally or alternatively, the policy may be determined on the fly. In some exemplary embodiments, the stochastic controller may provide for a deterministic decision albeit the stochastic nature of the modeled environment. Additionally or alternatively, the stochastic controller may provide for a non-deterministic decision.

On Step 240, based on a determination to alert the user, an alert is issued and the user is notified of the event. In some cases, the user may be notified via a user device, such as a mobile device, a smartphone, a Personal Digital Assistant (PDA), or the like. Other devices may also be used to convey to the user the alert to the user.

Figure 2B:
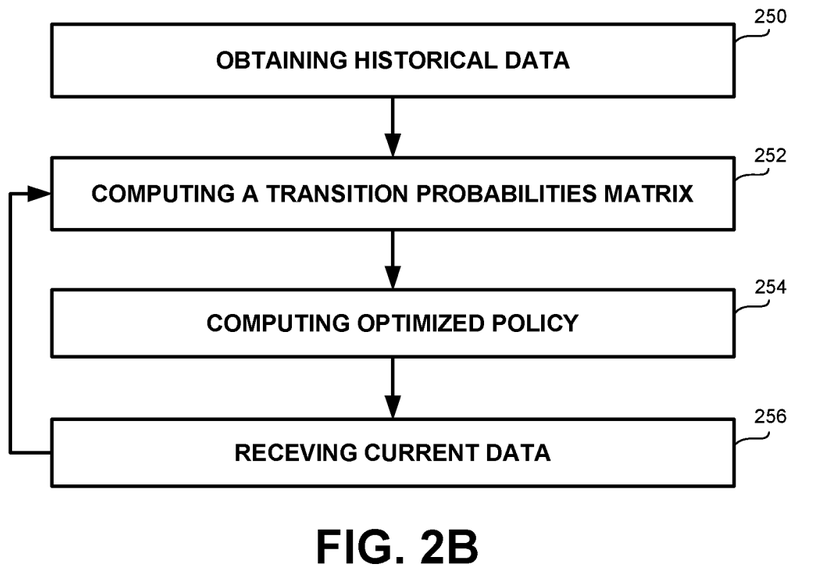

Referring now to FIG. 2B showing a flowchart diagram of a method, in accordance with some exemplary embodiments of the subject matter. FIG. 2B exemplifies computation of optimized policy. In some cases, the policy is computed based on an MDP framework, which may include a transition probabilities matrix. Such matrix may be part of a modeling of an environment in which the stochastic controller s is active.

Historical data of events may be obtained (250). Based on the historical data a transition probabilities matrix may be computed (252) so as to take into account transitions between states under various actions, as were exemplified during a past time frame recorded in the historical data. An optimized policy may be computed based on the computed matrix (254).

In some cases, current data may be received (256) and the matrix may be modified accordingly (252). Current data may exemplify different probabilities, such as in case there is some change in the environment. In such cases, the policy may be re-computed to take into account the matrix. In some cases, policy re-computation may be performed in a remote server, such as in a cloud computing platform. Additionally or alternatively, re-computation may be performed periodically, such as on a daily basis, on a weekly basis, or the like. In some cases, the re-computed probability matrix may be computed based on both the historical data and the current data. In some cases, the computation may be based on data in a sliding window, such as all data in the last month, in the last year, in the last week, or the like.

Figure 2C:
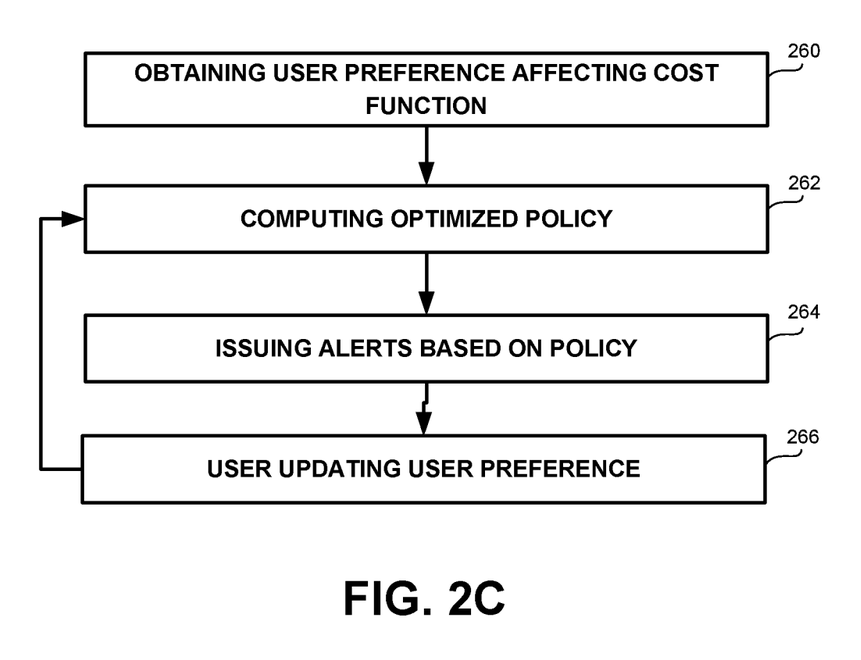

Referring now to FIG. 2C showing a flowchart diagram of a method, in accordance with some exemplary embodiments of the subject matter. FIG. 2C exemplifies computation of optimized policy. In some cases, the policy is computed based on a cost function that is affected by a user preference.

User preference may be obtained (260) such as using a UI element controlled by the user and displayed thereto via a mobile device or other user device. The device may or may not be the same device through which alerts are conveyed to the user. The user preference may affect a cost function, such as the immediate cost function of a MDP. An optimized policy may be computed (262), such as by minimizing an objective function. The policy may be applied when events are obtained and alerts are determined to be issued based thereon (264). In some cases, the policy is applied by a stochastic controller. The user may update her preference (266), such as to indicate increase or decrease in the rate of notifications, and an optimized policy may be re-computed accordingly (262).

Figure 3:
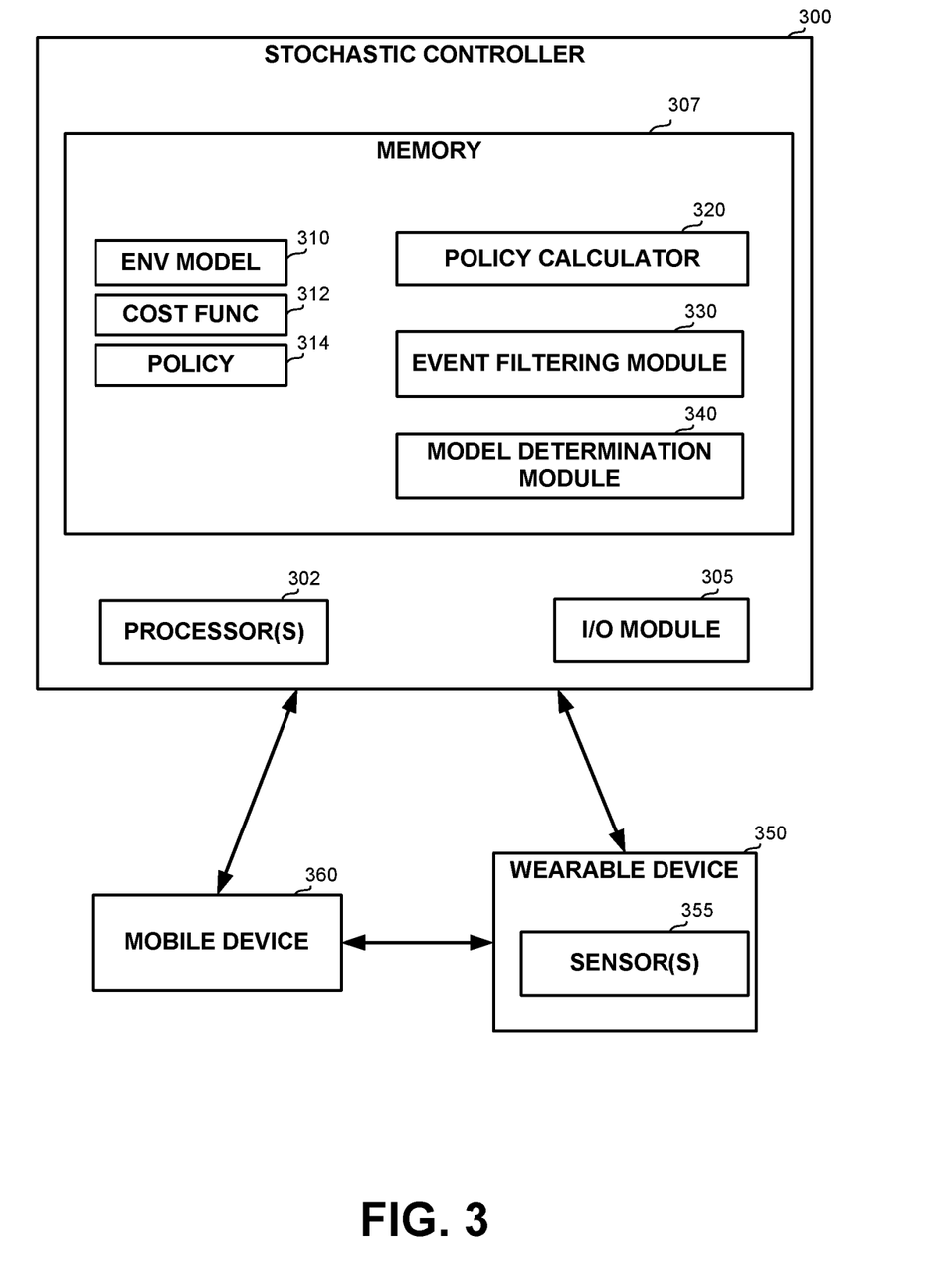
FIG. 3 shows a block diagram of an apparatus, in accordance with some exemplary embodiments of the disclosed subject matter.

Referring now to FIG. 3 showing an apparatus in accordance with some exemplary embodiments of the disclosed subject matter.

In some exemplary embodiments, Stochastic Controller 300, such as 130 of FIG. 1, may comprise one or more Processor(s) 302. Processor 302 may be a Central Processing Unit (CPU), a microprocessor, an electronic circuit, an Integrated Circuit (IC) or the like. Processor 302 may be utilized to perform computations required by Stochastic Controller 300 or any of it subcomponents.

In some exemplary embodiments of the disclosed subject matter, Stochastic Controller 300 may comprise an Input/Output (I/O) Module 305. I/O Module 305 may be utilized to provide an output to and receive input from a user or other computing devices. Additionally or alternatively, Stochastic Controller 300 may operate without user input and output.

In some exemplary embodiments, Stochastic Controller 300 may be directly or indirectly connected to a Wearable Device 350 having one or more Sensors 355. Based on sensor readings, Stochastic Controller 300 or other computing device, such as a device implementing an analytics lab, may generate events that may or may not invoke an alert to the user. In some exemplary embodiments, Stochastic Controller 300 may determine whether or not to issue an alert. In one embodiment, Mobile Device 360 may implement the analytics lab. Additionally or alternatively, Mobile Device 360 may be a user device used to convey alerts to the user and Stochastic Controller 300 may issue alerts by transmitting them to Mobile Device 360 which, in turn, notifies the user on their existence.

Memory 307 may be a hard disk drive, a Flash disk, a Random Access Memory (RAM), a memory chip, or the like. In some exemplary embodiments, Memory 307 may retain program code operative to cause Processor 302 to perform acts associated with any of the subcomponents of Stochastic Controller 300.

Environment Model 310 may be retained by Memory 307 and utilized to model the stochastic environment in which Stochastic Controller 300 operates. Model 310 may comprise a probability transition matrix.

Cost Function 312 may define a cost function that is based on Model 310. Cost Function 312 may be affected by preferences of the user, such as via defining weights. In some exemplary embodiments, Cost Function 312 may attribute cost to issuing an alert and a cost to dropping an alert, the weights of each portion may be controlled by the user. As a result, the user may control whether to increase or decrease general notification rate via controlling the cost function.

Policy 314 may determine a policy which optimizes the expected value of Cost Function 312, such as by minimizing the expected cost. Policy 314 may be computed automatically by Stochastic Controller 300 or by another computing device.

Policy Calculator 320 may be configured to calculate and re-calculate an optimized policy (314) based on Model 310 and Function 312. In some exemplary embodiments, Policy Calculator 320 may be invoked upon a user modifying her preference, periodically after Model 310 or Cost Function 312 are modified, or the like.

Event Filtering Module 330 may be configured to filter events by applying Policy 314. Filtered events may be ignored, while non-filtered events may invoke alerts which notify the user of the events.

Model Determination Module 340 may be configured to determine or update Model 310. In some cases, Model Determination Module 340 may obtain events, sensor readings, or the like and determine the model, such as by defining states, actions and transition probability matrix. In some exemplary embodiments, the determination may be assisted by a user who may manually or semi-automatically define states and/or actions. In some exemplary embodiments, the transition probability matrix may be computed based on historic data, based on current data, based on combination thereof, or the like.

General Embodiment

In some exemplary embodiments, discounted cost MDP is a 5-tuple <S, U, P, c, β>, where S is a finite set of states, $<s_1, s_2, \ldots s_s> \in S$ (an element from S is a vector); where U is a finite set of actions, $<u_1, u_2, \ldots u_u> \in U$ (an element from U is a vector); where P is a transition probabilities matrix, $P(s_j|s_i, u_k) \in [0,1]$; where $c \in R^{|s| \times |s| \cdot |u|}$ is a vector of costs per pair (state, action); where $s_t$ is a random variable which represents state at time t, where $u_t$ is a random variable which represents action at time t.

In some exemplary embodiments, expectation of cost at time t with policy $$\pi: S \to U, E_t^\pi[c(s_t, u_t)] = \sum_{s \in S, u \in U} c(s, u) P_{s_0}^\pi (s_t = s, u_t = u).$$

In some exemplary embodiments, for the discount cost model ($0 \le \beta < 1$-dicountFactor), cost may be defined as $$c(\pi) = (1-\beta) \sum_t \beta^t E_t^\pi[c(s_t, u_t)].$$

The optimization problem may be defined as follows: Given <S, U, P, c, β> as defined above find policy π* such that C(π*) is minimized.

An Embodiment

In a setting where there are two sensors: body temperature (T) and heart rate (HR), the MDP is based on the following definitions:

δ=15 min,

TEventsArrived—a number of T events arrived over the last δ;

TEventIssued—a number of T events issued from the beginning of the day/shift/other time frame;

HREventsArrived—a number of HR events arrived over the last δ;

HReventIssued—a number of HR events issued from the beginning of the day/shift/other time frame;

States (S)={#TEventsArrived ∈{0,5,15}, #HREventsArrived∈{0,5,15}, #TEventIssued∈{0,20,100}, #HREventIssued∈{0,20,100}, Severity∈{0,1}}

Actions (A)={TNotification∈{0,1}, HRNotification∈{0, 1}}

Immediate Cost function (c(s,a))=(s+a·notify+q·(1−notify)), where q is a penalty parameter for missing a notification, s is a state and a is an action. In some embodiments, the cost function includes two penalties: a penalty for missing an alert and a penalty for excessive alerts. The second penalty may be controlled by the user using the user's preference, such as by setting directly or indirectly a weight affecting its importance in the overall computed cost. In some exemplary embodiments, q may be a function q(fb), where fb is a feedback argument provided by the user.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method comprising:
   receiving derived events indicative of potential notification to the user from an analysis component comprising an analytics lab of a modular platform, wherein the derived events are generated using complex event processing of the events generated from multiple sensor readings of one or more sensors of a wearable device and a sensor not mounted on any wearable device;
   determining, by a notification component of the modular platform comprising a stochastic controller that is independent of the analysis component, whether or not to provide one or more alerts to a user in any future timeframe based on the derived events and based on a user preference, wherein the analysis component does not process previous event notifications, wherein the one or more alerts are configured to alert the user that respective events of the events have occurred, wherein the user preference is indicative of a desired notification rate of the user, wherein the stochastic controller comprises a stochastic model of an environment, wherein said determining comprises determining a decision for an event of the events, wherein the decision indicates whether or not an alert regarding the event is to be issued for the event, wherein the stochastic controller is to utilize a Markov Decision Process (MDP) to make the determination based on an optimized policy applied so as to minimize an objective function, wherein the objective function comprises a first penalty for excessive alerts and a second penalty for missing alerts that is controlled based on the user preference; and
   outputting alerts to the user based on said determining, wherein said outputting comprises outputting the alert regarding the event if the decision indicates that the alert is to be issued, wherein upon identifying that the decision indicates that the alert is not to be issued for the event, dropping the alert without issuing the alert for the event in any future timeframe.

2. The computer-implemented method of claim 1, wherein the objective function comprises a user-defined weight representing the user preference that is controllable by the user during operation of the wearable device.

3. The computer-implemented method of claim 1,
   wherein the MDP comprises: a set of states, a set of actions, an immediate cost function based on a state and an associated event, a transition probabilities matrix, and an initial states distribution;
   wherein said computer-implemented method further comprises computing an optimized policy that minimizes an expected aggregated cost that is based on the immediate cost function;
   wherein said determining comprises applying the optimized policy.

4. The computer-implemented method of claim 3, wherein the transition probabilities matrix is computed based on historical data.

5. The computer-implemented method of claim 4,
   wherein the transition probabilities matrix is updated based on current data provided by an analytics library, wherein the method further comprises re-computing a new optimized policy that minimizes the expected aggregated cost function in view of the updated probabilities matrix; and
applying the new optimized policy to perform said determining.

6. The computer-implemented method of claim 3, further comprising:
obtaining user feedback to modify the user preference;
re-computing a new optimized policy that minimizes the expected aggregated cost function based on the modified user preference; and
applying the new optimized policy to perform said determining.

7. The computer-implemented method of claim 1, wherein the wearable device is worn by the user.

8. The computer-implemented method of claim 1, wherein the wearable device is worn by a person that is being monitored by the user.

9. A computerized apparatus having a processor, the processor being adapted to perform the steps of:
receiving derived events indicative of potential notification to the user from an analysis component comprising an analytics lab of a modular platform, wherein the derived events are generated using complex event processing of the events generated from multiple sensor readings of one or more sensors of a wearable device and a sensor not mounted on any wearable device;
determining, by a notification component of the modular platform comprising a stochastic controller that is independent of the analysis component, whether or not to provide one or more alerts to a user in any future timeframe based on the derived events and based on a user preference, wherein the analysis component does not process previous event notifications, wherein the one or more alerts are configured to alert the user that respective events of the events have occurred, wherein the user preference is indicative of a desired notification rate of the user, wherein the stochastic controller comprises a stochastic model of an environment, wherein said determining comprises determining a filtering decision for an event of the events, the filtering decision indicating whether or not the event should be filtered, wherein the filtering decision indicates whether or not an alert regarding the event is to be issued for the event based on whether or not the event is to be filtered, wherein the stochastic controller is to utilize a Markov Decision Process (MDP) to make the determination based on an optimized policy applied so as to minimize an objective function, wherein the objective function comprises a first penalty for excessive alerts and a second penalty for missing alerts that is controlled based on the user preference; and
outputting alerts to the user based on said determining, wherein said outputting comprises outputting the alert regarding the event if the decision indicates that the alert is to be issued, wherein upon determining that the filtering decision indicates that the event is to be filtered, the alert regarding the event is not issued in any future timeframe.

10. The computerized apparatus of claim 9, wherein the objective function comprises a user-defined weight representing the user preference that is controllable by the user during operation of the wearable device.

11. The computerized apparatus of claim 9,
wherein the MDP comprises: a set of states, a set of actions, an immediate cost function based on a state and an associated event, a transition probabilities matrix, and an initial states distribution;
wherein said processor is further adapted to perform: computing an optimized policy that minimizes an expected aggregated cost that is based on the immediate cost function;
wherein said determining comprises applying the optimized policy.

12. The computerized apparatus of claim 11, wherein the transition probabilities matrix is computed based on historical data.

13. The computerized apparatus of claim 12,
wherein the transition probabilities matrix is updated based on current data provided by an analytics library,
wherein said processor is further adapted to perform:
re-computing a new optimized policy that minimizes the expected aggregated cost function in view of the updated probabilities matrix; and
applying the new optimized policy to perform said determining.

14. The computerized apparatus of claim 11, wherein said processor is further adapted to perform:
obtaining user feedback to modify the user preference;
re-computing a new optimized policy that minimizes the expected aggregated cost function based on the modified user preference; and
applying the new optimized policy to perform said determining.

15. The computerized apparatus of claim 9, wherein the wearable device is worn by the user.

16. The computerized apparatus of claim 9, wherein the wearable device is worn by a person that is being monitored by the user.

17. A computer program product comprising a non-transitory computer readable storage medium retaining program instructions, which program instructions when read by a processor, cause the processor to perform a method comprising:
receiving derived events indicative of potential notification to the user from an analysis component comprising an analytics lab of a modular platform, wherein the derived events are generated using complex event processing of the events generated from multiple sensor readings of one or more sensors of a wearable device and a sensor not mounted on any wearable device;
determining, by a notification component of the modular platform comprising a stochastic controller that is independent of the analysis component, a policy indicating whether or not to provide one or more alerts to a user in any future timeframe based on events and based on a user preference, wherein the analysis component does not process previous event notifications, wherein the one or more alerts are configured to alert the user that respective events of the events have occurred, wherein the user preference comprises a user-defined weight that is controllable by the user, wherein the user preference is indicative of a desired notification rate of the user, wherein the user-defined weight is configured to be applied to a penalty for missing alerts, wherein the stochastic controller comprises a stochastic model of an environment, wherein said determining comprises determining a decision for an event of the events according to the policy, wherein the decision indicates whether or not an alert regarding the event is to be issued for the event, wherein the stochastic controller is to utilize a Markov Decision Process (MDP) to make the determination based on an optimized policy applied so as to minimize an objective function, wherein the objective function comprises a first penalty for excessive alerts and a second penalty comprising the penalty for missing alerts that is controlled based on the user preference; and outputting alerts to the user based on said determining, wherein said outputting comprises outputting the alert if the decision indicates that the alert is to be issued, wherein, upon obtaining from the user a modified user preference indicative of a decrease in the desired notification rate of the user, re-computing the policy based on the modified user preference at least by applying a decreased weight to the first penalty or the second penalty.

18. The computer-implemented method of claim 1, wherein the user preference is provided by the user, wherein the stochastic controller defines the objective function, wherein the objective function defines the first and second penalties, wherein the policy is configured to minimize an expected value of the objective function.

19. The computerized apparatus of claim 9, wherein the stochastic controller is adapted with an initial reduced model that is tuned during operation as new measurements are received from the one or more sensors of the wearable device.

20. The computerized apparatus of claim 9, wherein the sensors comprise a temperature sensor and a heart rate sensor.

21. The computer-implemented method of claim 1, wherein the notification component does not process computations required to analyze the sensor readings.

* * * * *

UNITED STATES PATENT AND TRADEMARK OFFICE
CERTIFICATE OF CORRECTION

PATENT NO. : 11,657,310 B2
APPLICATION NO. : 14/988763
DATED : May 23, 2023
INVENTOR(S) : Lior Limonad et al.

It is certified that error appears in the above-identified patent and that said Letters Patent is hereby corrected as shown below:

On the Title Page

Item (72), 3rd Inventor, should read Eliezer Segev Wasserkrug

Signed and Sealed this
First Day of August, 2023

Katherine Kelly Vidal
*Director of the United States Patent and Trademark Office*